(12) United States Patent
Scarcello

(10) Patent No.: US 7,686,275 B2
(45) Date of Patent: Mar. 30, 2010

(54) ADJUSTABLE ART DISPLAY

(76) Inventor: Stephen Joseph Scarcello, 1178 W. 16th St., San Pedro, CA (US) 90731

( * ) Notice: Subject to any disclaimer, the term of this patent is extended or adjusted under 35 U.S.C. 154(b) by 182 days.

(21) Appl. No.: 11/881,954

(22) Filed: Jul. 30, 2007

(65) Prior Publication Data

US 2008/0023615 A1    Jan. 31, 2008

Related U.S. Application Data

(60) Provisional application No. 60/820,647, filed on Jul. 28, 2006.

(51) Int. Cl.
*A47G 1/24*    (2006.01)
*B60R 1/02*    (2006.01)

(52) U.S. Cl. .................. 248/480; 248/475.1; 248/286.1; 248/231.91; 248/441.1; 248/447.1

(58) Field of Classification Search .............. 248/475.1, 248/480, 286.1, 231.91, 481, 441.1, 447.1
See application file for complete search history.

(56) References Cited

U.S. PATENT DOCUMENTS

| | | | | |
|---|---|---|---|---|
| 1,031,075 A | * | 7/1912 | Lundin | 403/58 |
| 1,178,072 A | * | 4/1916 | Hoag | 359/602 |
| 1,518,956 A | * | 12/1924 | Beitman | 359/602 |
| 2,019,789 A | * | 11/1935 | Mahannah | 269/71 |
| 2,573,443 A | * | 10/1951 | Holland | 248/480 |
| 3,019,709 A | * | 2/1962 | Teason | 359/865 |
| 3,998,421 A | * | 12/1976 | Clemison | 248/447.1 |
| 4,641,807 A | | 2/1987 | Phillips | |
| 4,815,836 A | * | 3/1989 | Byers et al. | 248/475.1 |
| 4,892,284 A | | 1/1990 | Kelrick | |
| 4,930,742 A | * | 6/1990 | Schofield et al. | 248/475.1 |
| 5,025,543 A | * | 6/1991 | Byers et al. | 29/401.1 |
| 5,489,080 A | * | 2/1996 | Allen | 248/480 |
| 5,496,007 A | * | 3/1996 | Reece et al. | 248/441.1 |
| 5,743,507 A | | 4/1998 | Rushing | |
| 5,816,557 A | | 10/1998 | Tepper | |
| 6,213,608 B1 | * | 4/2001 | Osgood | 359/841 |
| 6,371,429 B1 | * | 4/2002 | Gillespie | 248/354.1 |
| 6,390,433 B1 | * | 5/2002 | Kasa-Djukic | 248/441.1 |

(Continued)

*Primary Examiner*—J. Allen Shriver, II
*Assistant Examiner*—Michael McDuffie
(74) *Attorney, Agent, or Firm*—Marcia Devon

(57) ABSTRACT

An adjustable artwork display for suspending a displayed item, such as a picture, away from a wall surface is disclosed. The mounting bracket comprises a rigid, planar base that includes a rigid extension sleeve projecting away therefrom. At least one rigid extension rod is slidably and rotationally receivable within the extension sleeve and fixed therein. A front side of a picture plate includes at least one hook means adapted to support the picture. A rear side of the picture plate includes an extension rod attachment means that may slidably and rotationally receive the at least one extension rod therein. In use, the base is fixed to the wall surface with a mechanical fastener. With at least one extension rod fixed in the extension sleeve and also fixed to the picture plate, the picture may be suspended from the hook means of the picture plate away from the wall surface. Each extension rod may be rotated and slid within the extension sleeve and the extension rod attachment means of the picture plate to a desired position and fixed therein. As such, the artwork is substantially rigidly fixed to the wall surface, while projecting away from the wall.

15 Claims, 5 Drawing Sheets

U.S. PATENT DOCUMENTS 6,485,151 B2 * 11/2002 Coleburn ................... 359/842
6,550,739 B1    4/2003 Brindisi
6,779,772 B2 *  8/2004 De Leon ................... 248/476
6,955,437 B1 * 10/2005 Roberts ..................... 359/841
2005/0006552 A1 *  1/2005 Giles ....................... 248/467

* cited by examiner

ADJUSTABLE ART DISPLAY

CROSS-REFERENCE TO RELATED APPLICATIONS

This application claims the benefit of U.S. Provisional Patent Application 60/820,647 filed on Jul. 28, 2006.

STATEMENT REGARDING FEDERALLY SPONSORED RESEARCH AND DEVELOPMENT

Not Applicable.

FIELD OF THE INVENTION

This invention relates to support brackets, and more particularly to an adjustable bracket for mounting artwork so that it can be projected from a wall.

DISCUSSION OF RELATED ART

When hanging a picture, or other artwork displays on a wall, it is often desirable to adjust the position of the picture with respect to the wall. Many prior art devices are used to adjust the picture horizontally and vertically while hanging on the same plane as the wall. Examples of such devices are found in the following U.S. patents:

| U.S. Pat. No. | Inventor | Issue Date |
|---|---|---|
| 4,892,284 | Kelrick | Jan. 9, 1990 |
| 5,743,507 | Rushing | Apr. 28, 1998 |
| 5,816,557 | Tepper | Oct. 6, 1998 |
| 4,641,807 | Phillips | Feb. 10, 1987 |
| 6,550,739 | Brindisi | Apr. 22, 2003 |

All of these patents are suitable in their limited scope for adjustment of a picture with respect to a wall surface either horizontally or vertically. However, none of these patents disclose or suggest a means for adjusting the distance between the picture and the wall in a depth dimension, nor do they provide for tilting the plane of the picture with respect to the plane of the wall. Projecting pictures from the wall surface provides a new way of displaying artwork which is aesthetically pleasing when mounting artwork on a wall or other surface.

Therefore, there is a need for an adjustable artwork display that provides for displaying artwork projected from a wall surface with the orientation of the artwork adjustable in three dimensions. Such a needed device would provide for a rigid mounting of the picture with respect to the wall, yet would allow the picture to be offset from the wall surface and projecting at a distance selected by the user. Further, such a needed device would provide means for tilting the plane of the picture with respect to the wall, such that the picture could be displayed in a plane that intersects the plane of the wall surface. The present invention accomplishes these objectives.

SUMMARY OF THE INVENTION

The present invention is an artwork mounting bracket for suspending a displayed item, such as a picture, and projecting it from the wall surface. The invention permits the user to adjust the artwork in three dimensions, including the depth dimension. The mounting bracket comprises a rigid, planar base having at least one mounting aperture. One side of the base includes a rigid extension sleeve projecting from the base. A locking mechanism is included, such as a set screw, rotationally captured within a threaded aperture. At least one rigid extension rod is slidably and rotationally receivable within the extension sleeve and fixed therein with the locking mechanism.

A rigid, planar picture plate is further provided as one of the elements used to connect the rest of the assembly to the artwork. The picture plate preferably includes a plurality of the apertures which are adapted to receive fasteners. One side of the picture plate includes an extension rod attachment means, such as a rigid sleeve, which may slidably and rotationally receive at least one extension rod. The rigid, extension sleeve is fixed to one side of the picture plate. The extension sleeve further includes a second rod locking means, such as a pair of set screws placed within the threaded apertures formed in the extension sleeve.

The other side of the picture plate is placed flat against two picture backing bars. The backing bars have apertures which are placed to align with the apertures on the picture plate to receive fasteners, such a nuts and bolts, and the like, well-known in the art. The two picture backing bars support the artwork and provide a platform to mount the entire assembly to the artwork. Spacing pads, preferably made from felt or other soft material, may be adhesively applied to each backing bar and the front side of the picture plate so as to cushion and protect the picture from the rigid picture plate and backing bars.

A pivot member is included to provide the ability to adjust the orientation of the artwork relative to the wall. The pivot member has first and second arms with the first arm received by the extension sleeve of the picture plate. The second arm is removably connected to one or more extension rods. The pivot joint permits the user to adjust the displayed artwork. In one preferred embodiment, the pivot member may advantageously be a ball joint which provides 360 degree movement.

A rigid, linear coupling sleeve may be further included for slidably and rotationally receiving two of the extension rods therein. Such a coupling sleeve may be used to further extend the picture away from the wall surface, and includes a third and fourth locking means.

In use, at least one mechanical fastener, such as a screw or bolt, may be used to secure the base to the wall surface through the at least one mounting aperture therein. With at least one extension rod fixed in the extension sleeve and also fixed to the picture plate, the picture may be suspended from the hook means of the picture plate away from the wall surface. Each extension rod may be rotated and slid within the extension sleeve and the extension rod attachment means of the picture plate to a desired position and fixed therein with the first and second rod locking means. The pivot member is adjusted to its desired location so that the picture is at the angle desired by the user while the assembly is substantially rigidly fixed to the wall surface. The artwork may be displayed in a plane which intersects the plane of the wall surface in a manner which is aesthetically pleasing to the user. Thus, the artwork is offset from, and projects from the wall, and is adjustable in three dimensions.

Further, the present invention allows for tilting the plane of the picture with respect to the wall, such that the picture may be displayed in a plane that intersects the plane of the wall surface. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENTS

Figure 1:
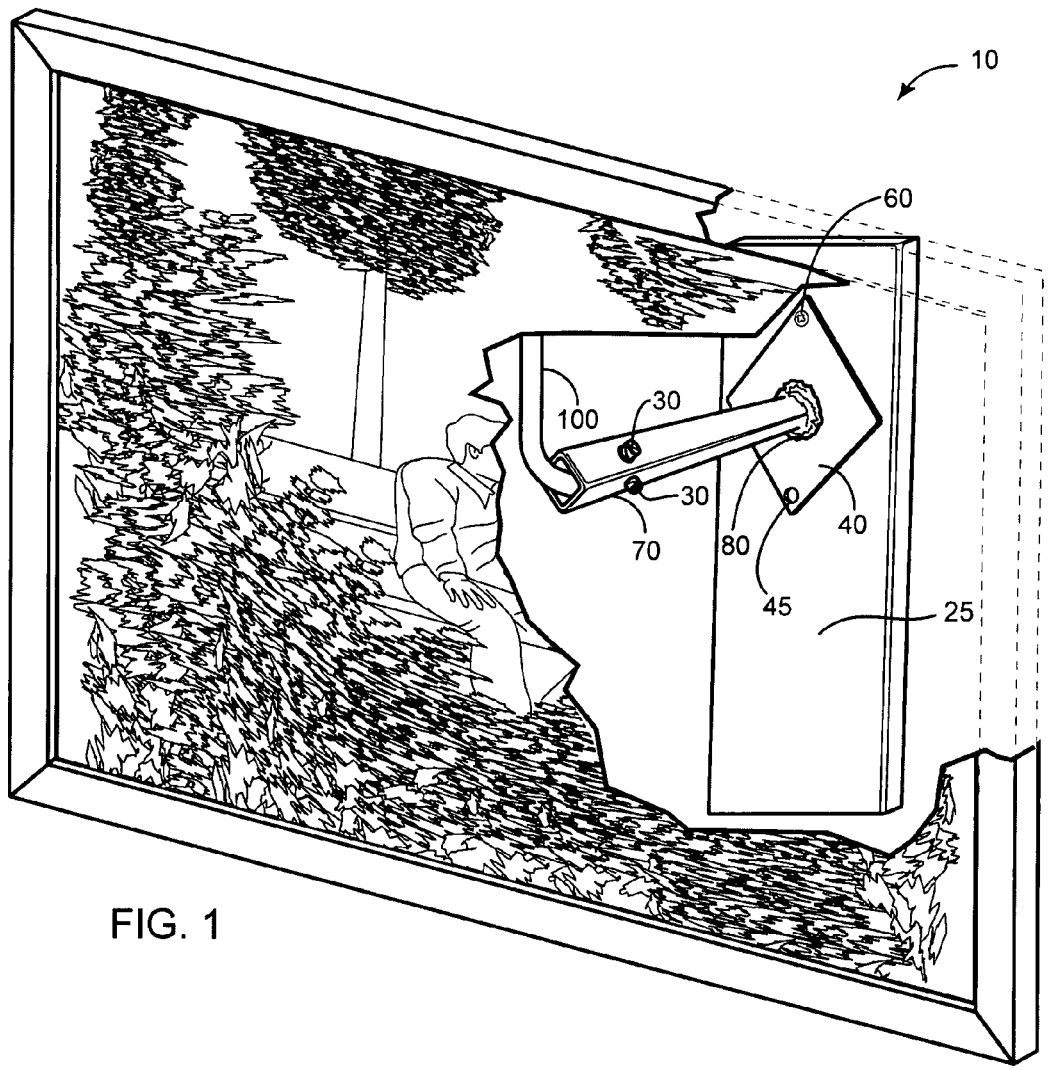
FIG. 1 is a perspective view of an adjustable artwork display of the invention.
Figure 2:
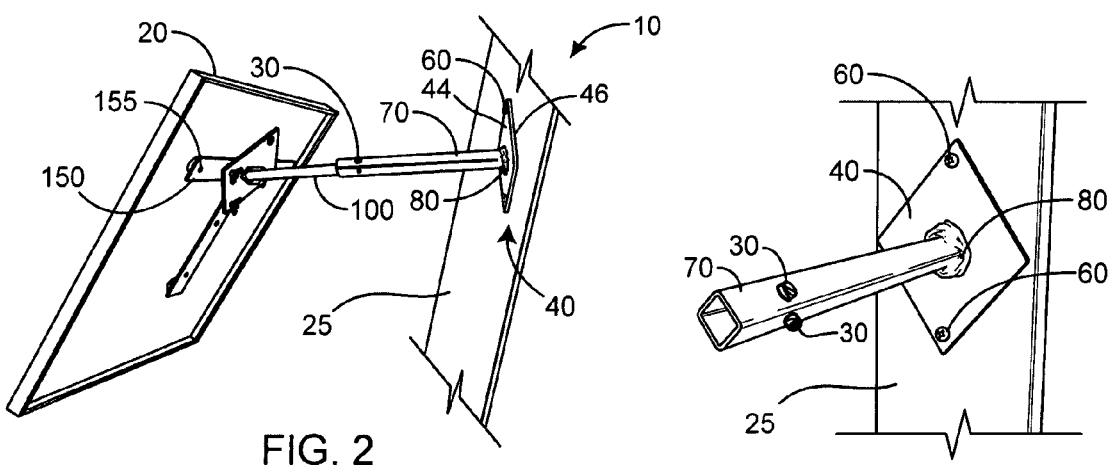
FIG. 2 is a perspective rear view of the adjustable artwork display, illustrated with an upward tilt of the picture.

FIGS. 1 and 2 illustrate an adjustable artwork display 10 for suspending an item or artwork such as a picture 20, projecting outward from a wall surface 25. While the wall surface 25 is illustrated herein, it should be understood that the picture 20 may also be fixed to a door, a post, or any other vertical or horizontal surface as desired. Further, while the framed picture 20 is illustrated in FIGS. 1 and 2, other items (not shown) could easily be mounted to the wall surface 25, such as display cases, paintings, sculptures, craft projects, or any other object suitable for display. Moreover, one of the embodiments of the present invention provides for displaying the artwork from the corner intersection of two walls.

Figure 3:
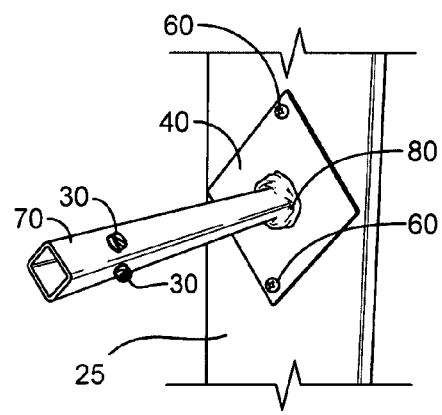
FIG. 3 is a partial perspective view of the invention, illustrating an adjustable artwork display base.

The adjustable artwork display 10 comprises a rigid, planar base 40 having at least a front side 44, a back side 46, and at least one mounting aperture 45 therethrough. The base 40 is preferably formed from a stock sheet metal material, but may also be a rigid molded or stamped plastic material, wood, or other suitably rigid materials. The front side 44 of the base 40 includes a rigid extension sleeve 70, also preferably made of metal and projecting outward from the plane of the wall (FIG. 3). The extension sleeve 70 may be fixed to the base 40 by a weld 80, integrally formed with the base 40, or attached to the base 40 in some other suitable manner known in the art and dependent upon the materials used for the base 40 and the sleeve 70. The extension sleeve 70 includes a rod locking means 30, such as a set screw 35 rotationally captured within a threaded aperture 36. The locking means 30 may also be a thumb screw, a manually actuated knob, or the like.

Extension rods 100 are slidably and rotationally receivable within the extension sleeve 70. The extension rods 100 are preferably made of cylindrical metal rod stock, and are rotationally and slidably fixed with the rod locking means 30 at any desired relative position therein. Preferably, at least two extension rods 100 are used: a cylindrical extension rod 105 (which may be 240 mm) and/or shorter extension rod 108 (which may be 150 mm and an L-shaped extension rod 106, shown in FIG. 4. The L-shaped extension rods are generally used with the picture plate having an extension sleeve 59 with the opening parallel to the plane of the picture plate 50 as shown in FIG. 5. Clearly, other shapes could be used for different extension rods than those illustrated in FIG. 4 without departing from the spirit or scope of the present invention. The invention may be packaged as a kit with the extension bars illustrated in FIG. 5. Various combinations of the different extension rods may be made by the user to create a display of his choosing without departing from the spirit or scope of the present invention.

Figure 6:
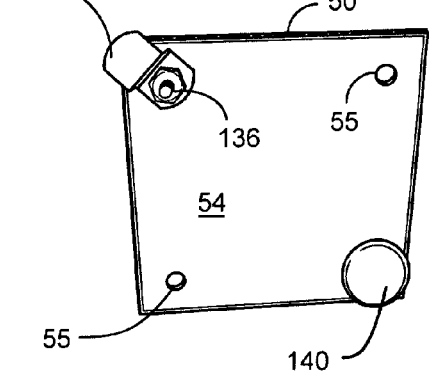
FIG. 6 is a front perspective view of the picture plate, illustrating a hanging hook and a pad spacer.

A rigid, planar picture plate 50 is included that has at least a front side 54 and a rear side 56. The picture plate 50 is preferably made from the same material as is the base 40. The front side 54 of the picture plate 50 includes at least one hook means 130 adapted to support the picture 20, the hook means 130 preferably being a hook 135 fixed to the picture plate 50 with a screw fastener 136 fixed through an aperture 55 in the picture plate 50 (FIGS. 5 and 6). The hook means 130 may also be a mechanical snap, hook-and-loop type fastener, or the like. The picture plate 50 preferably includes a plurality of the apertures 55. The rear side 56 includes an extension rod attachment means 58, such as a rigid sleeve 59 that may slidably and rotationally receive the at least one extension rod 100 therein. The rigid sleeve 59 is fixed to the rear side 56 of the picture plate 50, preferably by a weld 80 or the like. The extension rod attachment means 58 further includes a second rod locking means 31, such as the set screw 35 rotationally captured within the threaded aperture 36 formed into the rigid sleeve 59 (FIG. 5), a manually actuated knob (not shown), or similar means.

Figure 4:
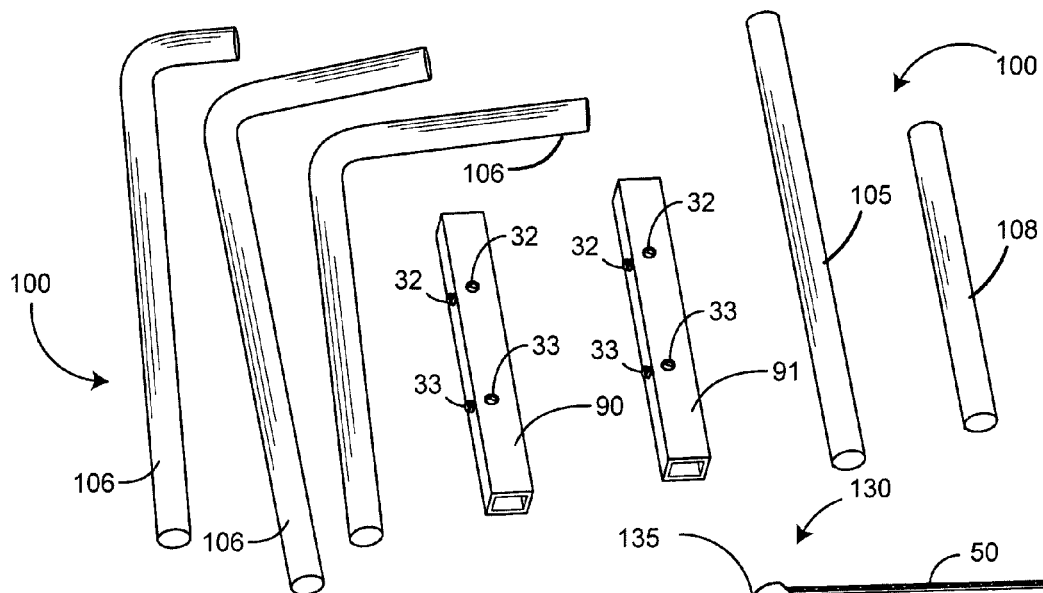
FIG. 4 is a perspective view of some of the extension bars of the present invention.
Figure 5:
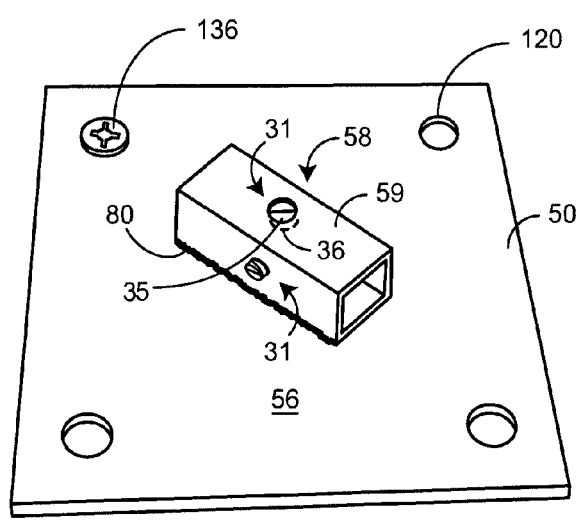
FIG. 5 is a rear perspective view of a picture plate of the invention.

Rigid, linear coupling sleeve 90 and 91 may be further included for slidably and rotationally receiving two of the extension rods 100 therein (FIG. 4). The coupling sleeve 90 may be used to further project and extend the picture 20 away from the wall surface 25, and includes a third and fourth locking means 32 and 33 (FIG. 4), each pair of set screw 35 rotationally captured within the threaded aperture 36, a manually actuated knob (not shown), or the like. Each pair of set screws are preferably placed in planes of the coupling sleeves and the planes of the extension sleeves which are perpendicular to each other which will provide a more secure locking mechanism than if they are in parallel planes.

Figure 7:
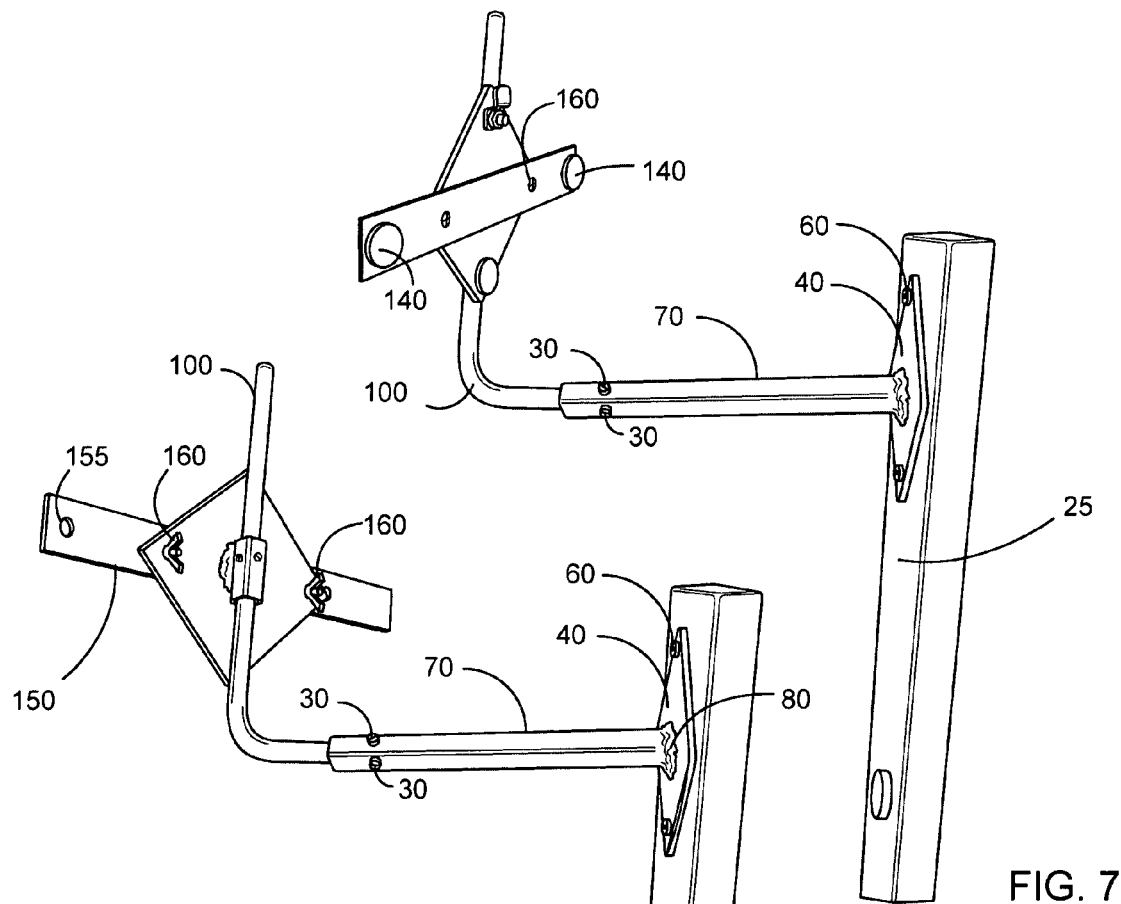
FIG. 7 is a perspective view of the invention as attached to a wall surface, illustrating the front side of the picture plate.
Figure 8:
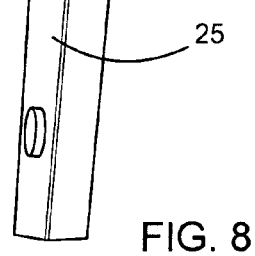
FIG. 8 is a perspective view of the invention as attached to the wall surface, illustrating the rear side of the picture plate.

At least one backing bar 150, and preferably two backing bars 150 and 170, formed as a length of pliable sheet metal stock, may be fixed to the front side 54 of the picture plate 50. Each backing bar 150 includes a plurality of apertures 155 therethrough (FIGS. 7 and 8) which align with apertures 55 in the picture plate 50, such that each backing bar 150 may be adjustably fixed to the picture plate 50 with screw fasteners 160 through the apertures 55. Spacing pads 140, preferably made from felt or other soft material, may be adhesively applied to each backing bar 150 and the front side 54 of the picture plate 50 so as to cushion and protect the picture 20 from the rigid picture plate 50 and backing bars 150 (FIGS. 6-8).

Figure 11:
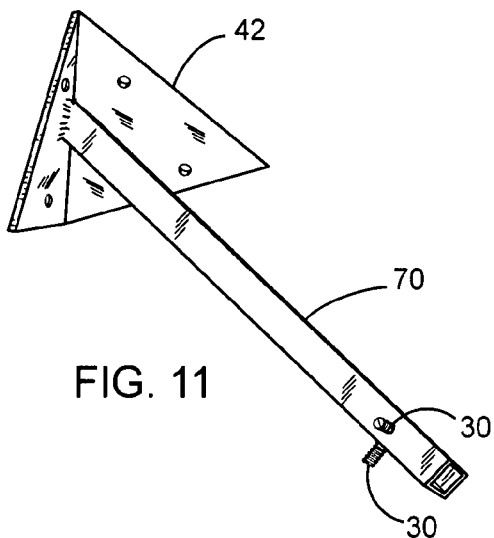
FIG. 11 is a perspective view of the corner mounting.

A corner bracket 42 may be utilized to mount the artwork in the corner of two walls as illustrated in FIG. 11. The corner bracket is formed as two perpendicular planes forming a V-shape to fit into the corner of two walls. An extension sleeve 70 is projected from the corner bracket and provided with a pair of set screws 30.

Figure 9:
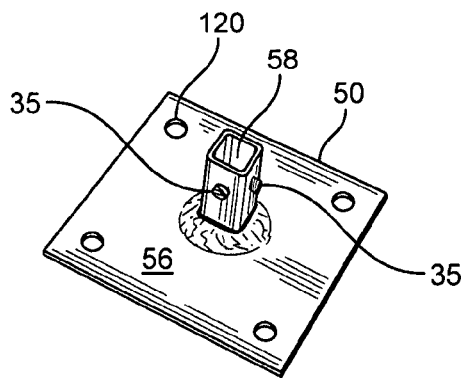
FIG. 9 is a rear perspective view of a picture plate of the invention.
Figure 10:
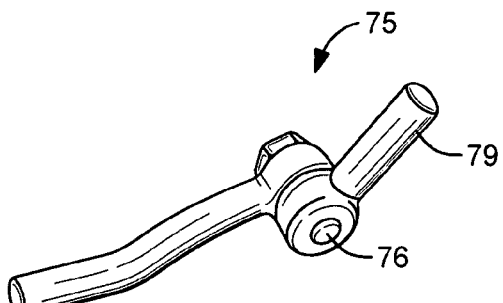
FIG. 10 is a perspective view of the pivot member of the present invention.
Figure 12:
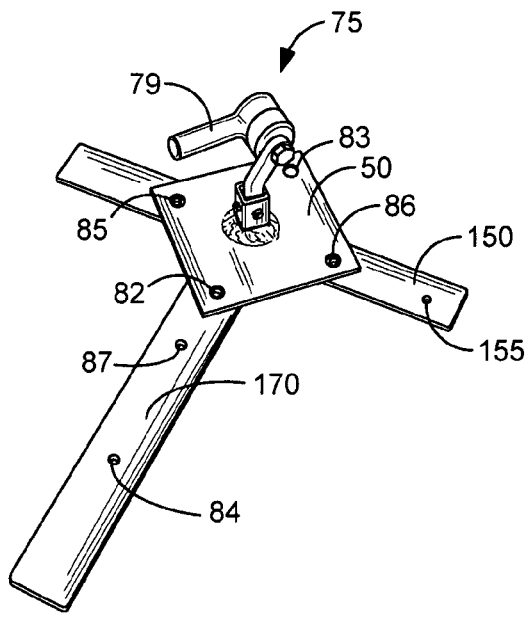
FIG. 12 is a perspective view of a picture plate with the pivot member and support bars which are placed against a picture.
Figure 13:
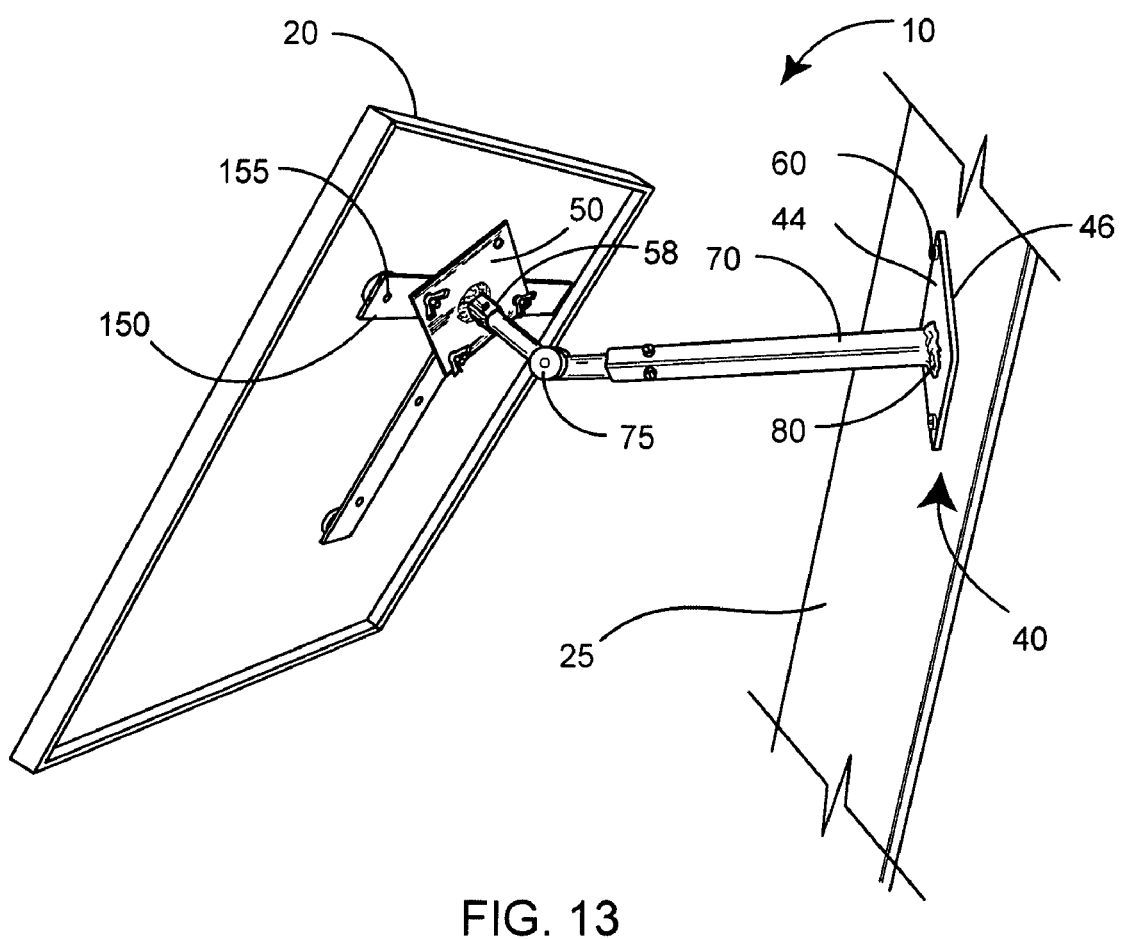
FIG. 13 is a perspective view of the preferred embodiment of the invention showing the pivot member in use with the other features of the invention.

In the preferred embodiment, a pivot member 75 is utilized as illustrated in FIG. 10. The pivot member 75 has first and second pivot arms 78 and 79 and a pivot pin 76. The pivot arm 79 of the pivot member 75 is inserted into the extension sleeve 58 (FIG. 9) as shown in FIG. 12. A ball joint (not shown) may be used as the pivot member to provide 360 degree rotation.

The backing bars 150 and 170 are typically placed perpendicular to each other with the base plate placed on top of the picture plate. Backing bars 150 and 170 are advantageously made of two different lengths so that the backing bars can be used to provide support for both types of pictures: one in which the picture is wider than they are long [landscape] and pictures which are longer than they are wide [portrait]. In the preferred embodiment, the backing bar 150 is 150 mm in length and the backing bar 170 is 200 mm. Each bar preferably has three holes, two which are centered to align with opposing picture plate apertures 85 and 86 and third which is used to align with the lowermost picture plate aperture 82 as illustrated in FIG. 12.

In use, at least one mechanical fastener 60, such as a screw or bolt, may be used to secure the base 40 to the wall surface 25 through at least one, and preferably two mounting aperture 45 and 60. With at least one extension rod 100 fixed in the extension sleeve 70 and also fixed to the picture plate 50, the picture 20 may be suspended from the hook means 130 of the picture plate 50 away from the wall surface 25. Each extension rod 100 may be rotated and slid within the extension sleeve 70 and the extension rod attachment means 58 of the picture plate 50 to a desired position and fixed therein with the first and second locking means 30 and 31. As such, the picture 20 is substantially rigidly fixed to the wall surface 25, albeit away therefrom by the adjustable artwork display 10.

While a particular form of the invention has been illustrated and described, it will be apparent that various modifications can be made without departing from the spirit and scope of the invention. For example, various materials may be used for the mounting bracket 10 provided they are rigid and strong enough to support the picture 20. Further, various shapes of extension rods 100 may be formed. Accordingly, it is not intended that the invention be limited, except as by the appended claims.

What is claimed is:

1. An adjustable artwork display for suspending a picture on a wall surface, comprising:
   a rigid, planar base having at least a front side, a back side, and at least one mounting aperture, the front side of the base including a rigid extension sleeve projecting from said base and including a first locking means;
   at least one rigid extensions rod adapted to be slideably received within said extension sleeve and said extension rods fixed relative to said extension sleeve with said first locking means;
   a rigid, planar picture plate having at least a front side and a rear side, the rear side including an extension rod attachment means having a second locking means, the front side of the picture plate including at least one hook means adapted to affix the artwork to the wall;
   a pivot member including a pivot pin and first and second pivot arms wherein said first pivot arm is adapted to be received by said extension sleeve and secured by said first locking means, wherein said second pivot arm is connected to said extension rod attachment means and secured by said second locking means, such that said first and second pivot arms rotate independently around said pivot pin; and
   at least one mechanical fastener fixing the base to the wall surface through the mounting aperture, with at least one extension rod secured in said extension sleeve of the picture plate, such that the artwork may be suspended from the hook means of said picture plate and the orientation of the artwork relative to the wall may be adjusted.

2. The adjustable artwork display of claim 1 further including a corner bracket connected to said extension sleeve for mounting the picture to a corner of a wall.

3. The adjustable artwork display of claim 1 wherein the extension sleeve is fixed to the base with a weld.

4. The adjustable artwork display of claim 1 wherein the rod locking means is a set screw and a threaded aperture.

5. The adjustable artwork display of claim 1 wherein at least one of the extension rods is linear.

6. The adjustable artwork display of claim 1 wherein at least one of the extension rods is formed into an L-shape.

7. The adjustable artwork display of claim 1 wherein the extension rod attachment means is a rigid sleeve adapted to receive the at least one extension rod slidably and rotationally therein, the rigid sleeve fixed to the rear side of the picture plate, and wherein the second rod locking means is a set screw and a threaded aperture formed into the rigid sleeve.

8. The adjustable artwork display of claim 1 wherein the hook means is a hook fixed to the picture plate with a screw fastener through a hook aperture in the picture plate.

9. The adjustable artwork display of claim 1 wherein the picture plate includes a plurality of the hook apertures.

10. The adjustable artwork display of claim 1 further including at least one backing bar fixed to the front side of the picture plate, the backing bar adapted to support the picture.

11. The adjustable artwork display of claim 10 wherein each of the at least one backing bars includes a plurality of apertures there through, and wherein the picture plate further includes a plurality of cooperating picture plate apertures there through, such that the backing bar may be adjustably fixed to the picture plate.

12. The adjustable artwork display of claim 1 further including a rigid coupling sleeve adapted to slidably and rotationally receive two of the extension rods therein, the coupling sleeve including a third and a fourth rod locking means for fixing each rod longitudinally and rotationally therein.

13. The adjustable artwork display of claim 1 further including a plurality of spacing pads fixed to the front side of the picture plate with adhesive.

14. The adjustable artwork display of claim 1 wherein said pivot member is a ball joint.

15. An adjustable artwork display for suspending a picture on a wall surface, comprising:
   a rigid, planar base having at least a front side, a back side, and at least one mounting aperture, the front side of the base including a rigid first extension sleeve projecting from said base and including a first locking means;
   at least one rigid extension rod adapted to be slidably received within said extension sleeve wherein said extension rod is fixed relative to said extension sleeve with said first locking means;
   a rigid, planar picture plate having at least a front side and a rear side, the rear side including a having second sleeve projecting from said picture plate and a second locking means, said sleeve receiving and securing said extension rod by said second locking means, the front side of the picture plate including at least one hook means adapted to affix the picture to the plate; and
   at least one mechanical fastener fixing the base to the wall surface through the mounting aperture, with at least one extension rod secured in said extension sleeve of the picture plate, such that the picture may be suspended from the hook means of said picture plate and the orientation of the picture relative to the wall may be adjusted.

* * * * *